United States Patent
Lee et al.

(10) Patent No.: US 11,747,717 B2
(45) Date of Patent: Sep. 5, 2023

(54) CAMERA MODULE

(71) Applicant: SAMSUNG ELECTRO-MECHANICS CO., LTD., Suwon-si (KR)

(72) Inventors: Ji Hae Lee, Suwon-si (KR); Ga Yeon Ju, Suwon-si (KR); Jae Sun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/669,791

(22) Filed: Feb. 11, 2022

(65) Prior Publication Data

US 2022/0350226 A1 Nov. 3, 2022

(30) Foreign Application Priority Data

Apr. 30, 2021 (KR) .................. 10-2021-0056679

(51) Int. Cl.
*G03B 17/17* (2021.01)
*G03B 17/12* (2021.01)
*H04N 23/51* (2023.01)
*H04N 23/55* (2023.01)
*G02B 5/20* (2006.01)

(52) U.S. Cl.
CPC ............. *G03B 17/17* (2013.01); *G03B 17/12* (2013.01); *H04N 23/51* (2023.01); *H04N 23/55* (2023.01); *G02B 5/208* (2013.01)

(58) Field of Classification Search
None
See application file for complete search history.

(56) References Cited

U.S. PATENT DOCUMENTS

| | | |
|---|---|---|
| 2005/0169620 A1 | 8/2005 | Minamio et al. |
| 2015/0077841 A1 | 3/2015 | Matsuo et al. |
| 2016/0154154 A1 | 6/2016 | Lee et al. |
| 2019/0094500 A1* | 3/2019 | Tseng ................. G02B 13/0045 |
| 2019/0196148 A1* | 6/2019 | Yao ......................... H04N 23/55 |
| 2019/0212632 A1* | 7/2019 | Miller .................. H04N 23/687 |
| 2019/0235202 A1* | 8/2019 | Smyth ...................... G02B 7/08 |

(Continued)

FOREIGN PATENT DOCUMENTS

| | | |
|---|---|---|
| JP | 2005-252223 A | 9/2005 |
| JP | 5877953 B2 | 2/2016 |

(Continued)

OTHER PUBLICATIONS

Korean Office Action dated Sep. 15, 2022, in counterpart Korean Patent Application No. 10-2021-0056679 (5 Pages in Korean, 7 Pages in English).

*Primary Examiner* — Rodney E Fuller
(74) *Attorney, Agent, or Firm* — NSIP Law

(57) ABSTRACT

A camera module includes a lens module including at least one lens, a housing configured to accommodate the lens module, a first reflection module disposed in front of the lens module, a second reflection module disposed behind the lens module, an image sensor module configured to receive light reflected from the second reflection module, and a light-blocking structure, disposed in the housing between the second reflection module and the image sensor module, including an aperture configured to pass light and an infrared cutoff filter disposed to cover the aperture.

14 Claims, 8 Drawing Sheets

(56) References Cited

U.S. PATENT DOCUMENTS

| | | | |
|---|---|---|---|
| 2019/0243112 A1* | 8/2019 | Yao | G03B 5/02 |
| 2020/0083270 A1 | 3/2020 | Yamamoto | |
| 2021/0063615 A1 | 3/2021 | Kim et al. | |
| 2021/0223662 A1* | 7/2021 | Miller | G03B 3/10 |
| 2021/0333529 A1* | 10/2021 | Yao | G02B 17/08 |
| 2022/0137363 A1* | 5/2022 | Shin | G02B 13/007 |
| | | | 359/733 |

FOREIGN PATENT DOCUMENTS

| | | |
|---|---|---|
| JP | 2016-090791 A | 5/2016 |
| KR | 10-2014-0033355 A | 3/2014 |
| KR | 10-2016-0064640 A | 6/2016 |
| KR | 10-2020-0014757 | 2/2020 |
| KR | 10-2021-0027197 A | 3/2021 |
| KR | 10-2021-0043234 A | 4/2021 |

\* cited by examiner

CAMERA MODULE

CROSS-REFERENCE TO RELATED APPLICATION

This application claims the benefit under 35 USC 119(a) of Korean Patent Application No. 10-2021-0056679 filed on Apr. 30, 2021 in the Korean Intellectual Property Office, the entire disclosure of which is incorporated herein by reference for all purposes.

BACKGROUND

1. Field

The following description relates to a camera module.

2. Description of Related Art

Recently, a camera module has been standardly installed in portable electronic devices including smartphones. The thickness of portable electronic devices tends to decrease in response to market demand, and accordingly, miniaturization of such a camera module is required.

In detail, to prevent the height of the camera module from greatly affecting the thickness of the portable electronic device, a camera module having a reflective member for changing a path of light has been proposed.

Such a camera module changes the path of light through the reflective member, and thus, there are advantages in that the total track length (the distance from the lens closest to the object side to the imaging plane of the image sensor) of the camera module does not affect the thickness of the portable electronic device.

In addition, a camera module employing a plurality of reflective members has been proposed to prevent the problem in which the total track length of the camera module is too increased in one direction.

However, in this case, since the optical path is formed to be long by the plurality of reflective members, the light may be re-reflected by the internal structure of the camera module before it is incident on the image sensor, and there is a possibility that a flare phenomenon may occur as the diffusely reflected light is incident on the image sensor.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module including at least one lens, a housing configured to accommodate the lens module, a first reflection module disposed in front of the lens module, a second reflection module disposed behind the lens module, an image sensor module configured to receive light reflected from the second reflection module, and a light-blocking structure, disposed in the housing between the second reflection module and the image sensor module, including an aperture configured to pass light and an infrared cutoff filter disposed to cover the aperture.

The light-blocking structure may include a frame in which the aperture is formed, and a protrusion extending from the frame towards the second reflection module.

An inner wall of the aperture may have an inclined surface.

The aperture may be configured to increase in size towards the image sensor module.

The infrared cutoff filter may be coupled to a surface of the frame facing the second reflection module or another surface of the frame facing the image sensor module.

An inner wall surface of the aperture may be rougher than another surface of the frame.

The frame may include a stepped portion fitted and coupled to the housing.

The frame may have a rectangular shape, and the protrusion may extend towards the second reflection module, in a space between opposing shorter sides of the frame and the aperture.

A surface of the protrusion may have a reflectance lower than a reflectance of a surface of the housing.

A surface of the protrusion may be rougher than a surface of the housing.

The infrared cutoff filter may include a light-blocking member.

The light-blocking member may be a black film continuously disposed along an edge of the infrared cutoff filter.

The infrared cutoff filter may have a rectangular shape, and intermediate portions of each side of the light-blocking member protrude inwards.

A size of a plane surrounded by the light-blocking member may be larger than a size of a side of the aperture facing the second reflection module and smaller than a size of another side of the aperture facing the image sensor module.

The intermediate portions may correspond to central portions of long and short sides of the light blocking member.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
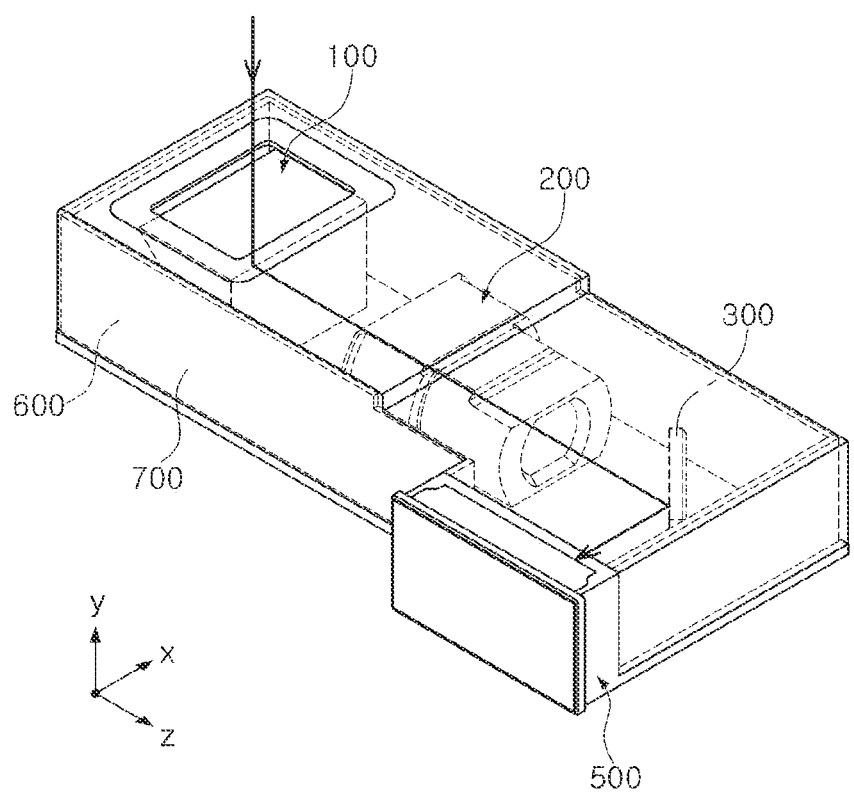
FIG. 1 is a schematic perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an example or embodiment, e.g., as to what an example or embodiment may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

Figure 2:
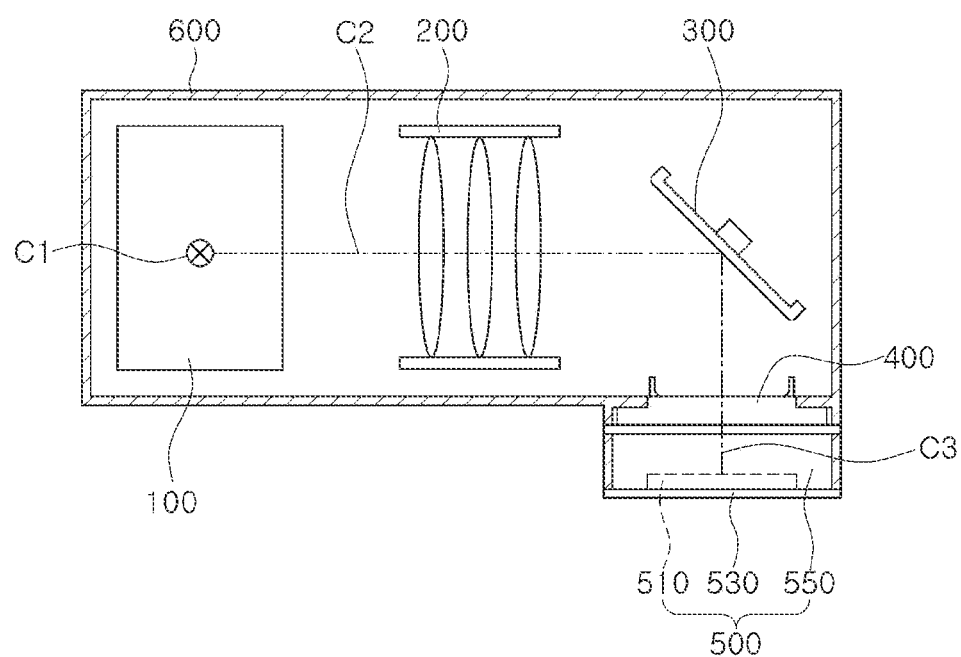
FIG. 2 is a schematic plan view of a camera module according to an example.

FIG. 1 is a schematic perspective view of a camera module according to an example, and FIG. 2 is a schematic plan view of a camera module according to an example.

Referring to FIGS. 1 and 2, a camera module according to an example includes a first reflection module 100, a lens module 200, a second reflection module 300, a light-blocking structure 400, an image sensor module 500, and a housing 600. The camera module may further include a case 700.

The housing 600 has an internal space in which the components of the camera module may be accommodated. The housing 600 may have a box shape with an open top.

The housing 600 may accommodate the lens module 200 therein. In addition, one or more of the first reflection module 100, the second reflection module 300, the light-blocking structure 400, and the image sensor module 500 may be accommodated in the housing 600. For example, the first reflection module 100, the lens module 200, the second reflection module 300, and the light-blocking structure 400 may be disposed in the internal space of the housing 600.

In FIGS. 1 and 2, an example in which the first reflection module 100, the lens module 200, the second reflection module 300, and the light-blocking structure 400 are all accommodated in the housing 600 is illustrated. However, unlike the example of FIGS. 1 and 2, the first reflection module 100 may be accommodated in a separate housing, and in this case, the separate housing may be combined with the housing 600 in which the lens module 200 is accommodated.

Referring to FIG. 2, the housing 600 may have a shape in which a planar shape thereof is bent in an 'L' shape. For example, in the internal space of the housing 600, the first reflection module 100, the lens module 200, and the second reflection module 300 are disposed along the optical axis of the lens module 200, and the image sensor module 500 may be coupled to the housing 600 in such a manner that an imaging plane of an image sensor 510 is disposed in a direction perpendicular to the optical axis of the lens module 200.

The case 700 may be coupled to the housing 600 to cover an open upper portion of the housing 600.

The lens module 200 is disposed inside of the housing 600. The lens module 200 may include one or more lenses enabling image formation on the image sensor 510 with the light incident in the camera module. The lens module 200 is disposed between the first reflection module 100 and the second reflection module 300.

The image sensor module 500 may include a sensor housing 550, the image sensor 510, and a printed circuit board 530. The image sensor 510 may be mounted on the printed circuit board 530, and the sensor housing 550 may be coupled to the printed circuit board 530.

The light reflected by the second reflection module 300 is received by the image sensor module 500 (e.g., the image sensor 510).

The first reflection module 100 is disposed in front of the lens module 200 and is configured to change the traveling direction of light. For example, the first reflection module 100 may include a prism or a mirror that reflects light.

The first reflection module 100 is configured to change the optical path as illustrated in FIGS. 1 and 2.

For example, referring to FIG. 2, the optical path of the light incident in the direction of a first optical axis C1 may be changed in a second optical axis C2 direction by the first reflection module 100. In this case, the first optical axis C1 and the second optical axis C2 intersect. For example, the first optical axis C1 and the second optical axis C2 may be perpendicular to each other.

The light of which the optical path has changed by the first reflection module 100 passes through the lens module 200 and is refracted.

On the other hand, the camera module according to an example may correct hand-shake during image capturing. For example, in the case in which hand-shake occurs during image capturing, a relative displacement corresponding to the hand-shake may be applied to the first reflection module 100 to correct the hand-shake.

For example, the first reflection module 100 may be rotated based on two axes to correct shake during image capturing.

The second reflection module 300 is disposed behind the lens module 200. In addition, the second reflection module 300 is disposed between the lens module 200 and the light-blocking structure 400.

The second reflection module 300 is configured to change the traveling direction of light. For example, the second reflection module 300 may include a prism or a mirror that reflects light.

The second reflection module 300 is configured to change the optical path as illustrated in FIGS. 1 and 2.

For example, after the optical path of the light is changed in the direction of the second optical axis C2 by the first reflection module 100, the optical path of the light passing through the lens module 200 may be re-changed in a third optical axis C3 direction by the second reflection module 300. In this case, the second optical axis C2 and the third optical axis C3 intersect. For example, the second optical axis C2 and the third optical axis C3 may be perpendicular to each other.

On the other hand, the third optical axis C3 may intersect the first optical axis C1 and the second optical axis C2, respectively. For example, the first optical axis C1, the second optical axis C2, and the third optical axis C3 may be perpendicular to each other. For example, the first optical axis C1 and the second optical axis C2 may be perpendicular to each other, and the third optical axis C3 may be perpendicular to both the first optical axis C1 and the second optical axis C2.

The first reflection module 100 and the second reflection module 300 may be configured to change optical paths in different directions.

For example, the traveling direction of the light incident in the direction of the first optical axis C1 may be changed in the direction of the second optical axis C2 intersecting the direction of the first optical axis C1, by the first reflection module 100.

Also, the light traveling in the direction of the second optical axis C2 may be changed in the direction of the third optical axis C3 intersecting the direction of the second optical axis C2, by the second reflection module 300.

Accordingly, the optical path may be changed twice until image is formed on the image sensor 510 by the light incident in the camera module. Accordingly, the height and length of the camera module may be significantly reduced while forming a relatively long optical path. Accordingly, a camera module having a relatively reduced size may be provided.

On the other hand, although it is described that the light path is changed twice, the technical idea of the present disclosure is not limited to the number of times the light path is changed, and the light path may be changed at least twice. In this specification, the second reflection module 300 may refer to a reflection module disposed closest to the image sensor module 500, among the plurality of reflection modules.

In the camera module according to an example, since the light path may be altered at least twice, the light path may be formed to be elongated.

However, when the light path is lengthened, the light may be re-reflected by the internal structure of the housing 600 before being incident on the image sensor 510, the diffusely reflected light is incident on the image sensor 510, and there is a possibility that flares may occur.

Figure 3:
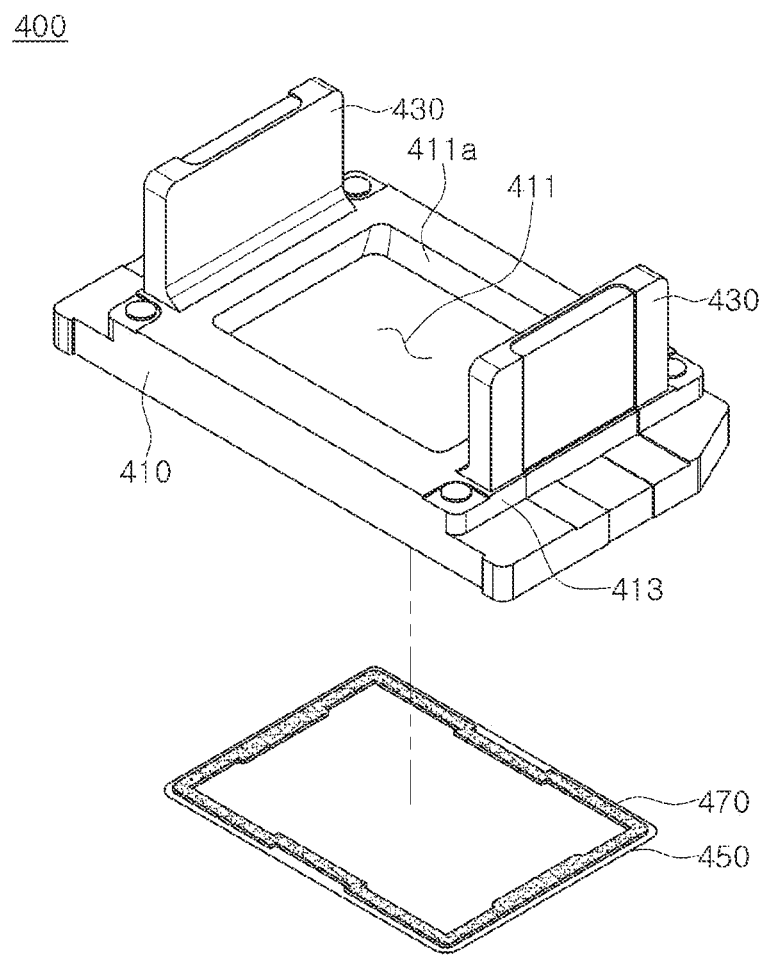
FIG. 3 is an exploded perspective view of a light-blocking structure according to an example.
Figure 4:
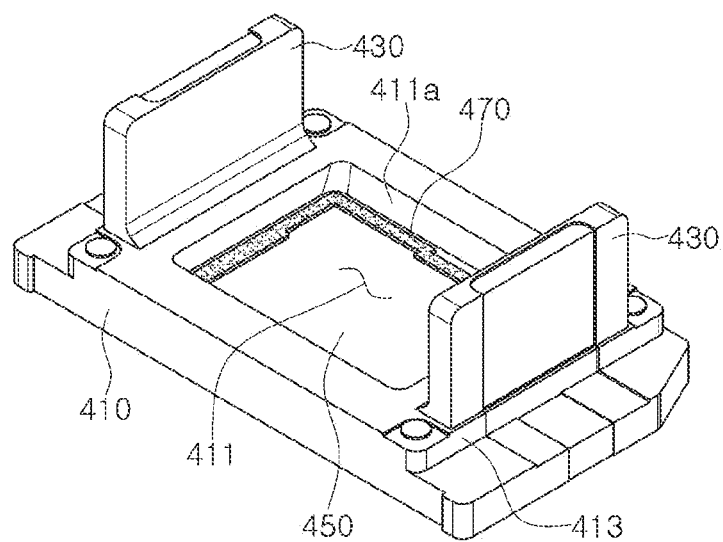
FIG. 4 is a perspective view of a light-blocking structure according to an example.

FIG. 3 is an exploded perspective view of a light-blocking structure according to an example, and FIG. 4 is a perspective view of the light-blocking structure according to an example.

Figure 5:
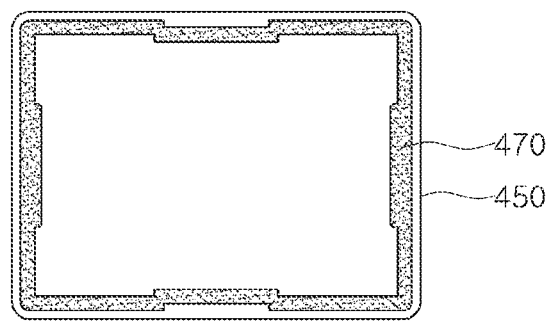
FIG. 5 is a plan view of an infrared cutoff filter.
Figure 6:
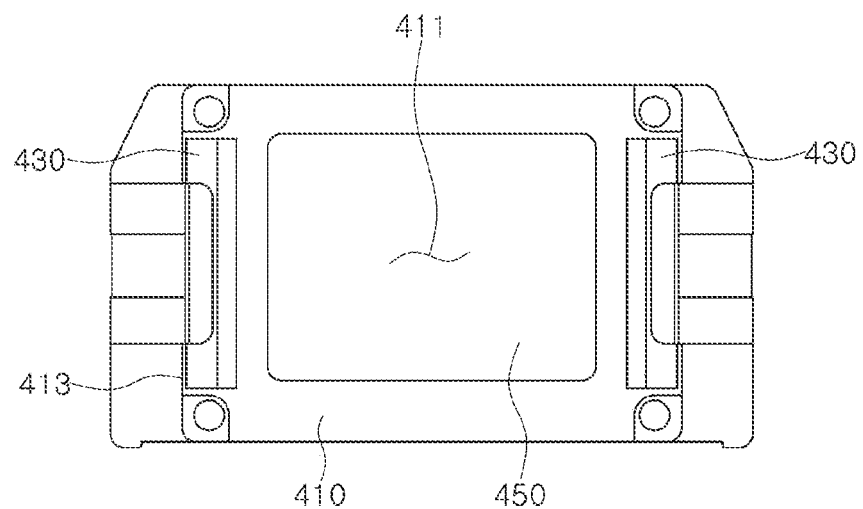
FIG. 6 is a plan view of a light-blocking structure according to an example.
Figure 7:
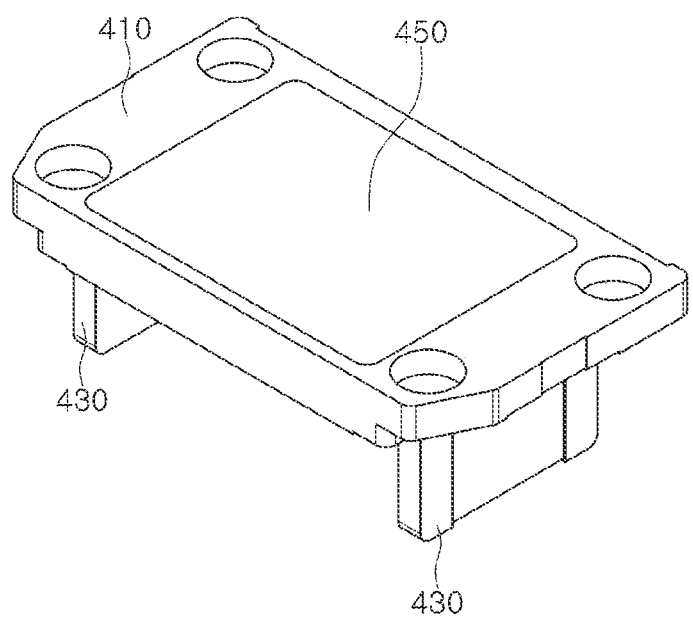
FIG. 7 is a bottom perspective view of a light-blocking structure according to an example.
Figure 8:
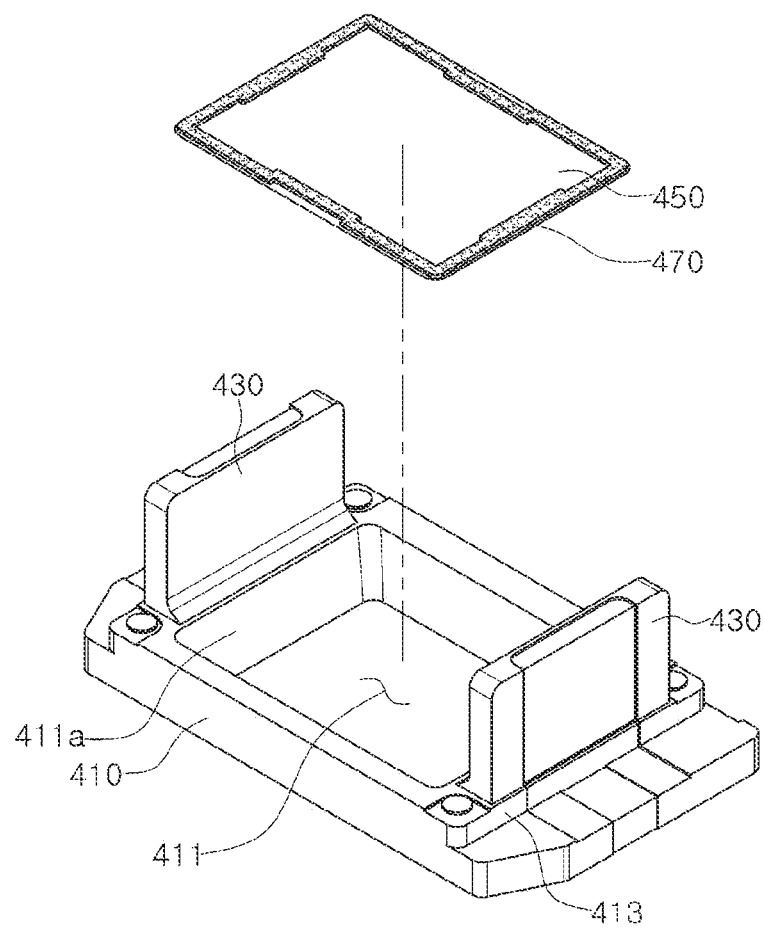
FIGS. 8 to 11 are views illustrating a modified example of the position of the infrared cutoff filter.
Figure 9:
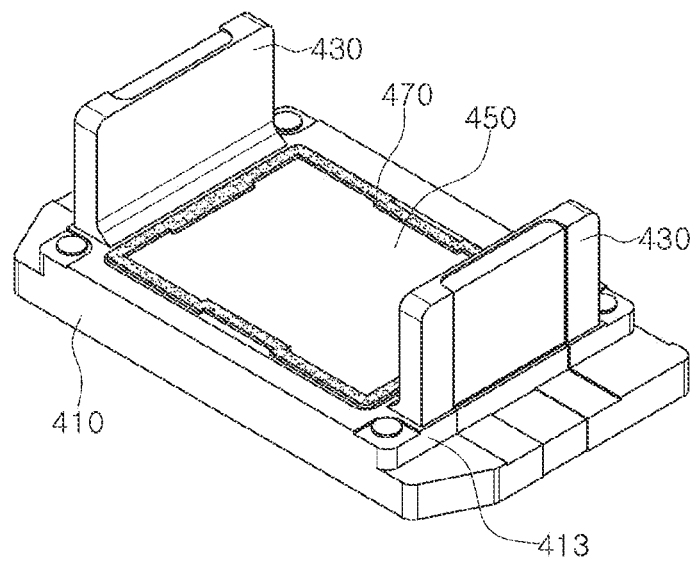
Figure 10:
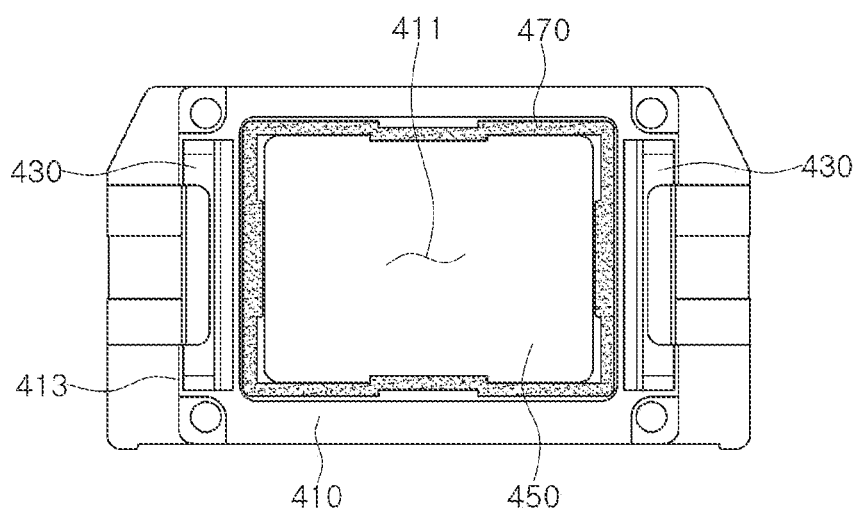
Figure 11:
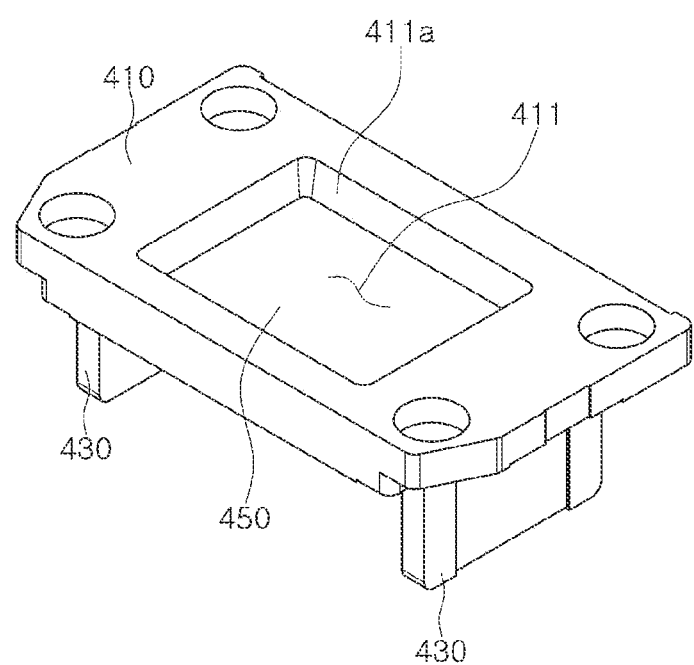

FIG. 5 is a plan view of an infrared cutoff filter, FIG. 6 is a plan view of a light-blocking structure according to an example, and FIG. 7 is a bottom perspective view of the light-blocking structure according to an example.

FIGS. 8 to 11 are views illustrating a modified example of the position of the infrared cutoff filter.

The camera module according to an example includes a light-blocking structure 400 to prevent a flare phenomenon due to unintentional reflection of light.

The light-blocking structure 400 may be disposed in a space between the second reflection module 300 and the image sensor module 500.

Accordingly, even when unintentional light reflection occurs, diffusely-reflected light may be prevented from being incident on the image sensor 510 by the light-blocking structure 400, thereby suppressing a flare phenomenon.

The light-blocking structure 400 includes a aperture 411 in the form of an opening, through which the light reflected by the second reflection module 300 passes, and may be disposed in the housing 600 to be located between the second reflection module 300 and the image sensor module 500.

Light used for image formation may pass through the aperture 411 and may be incident on the image sensor 510, and light that may cause a flare phenomenon may be blocked by the light-blocking structure 400.

Referring to FIG. 3, the light-blocking structure 400 includes a frame 410, a protrusion 430, and an infrared cutoff filter 450.

The frame 410 may have a rectangular shape having a long side and a short side, and the aperture 411 penetrating through the frame 410 is provided in the center of the frame 410.

An inclined surface is provided on an inner wall 411a of the aperture 411. For example, the inner wall 411a of the aperture 411 may include an inclined surface such that the size of the aperture 411 is increases in the traveling direction of light.

Accordingly, the aperture 411 may be configured to increase in size as it approaches the image sensor module 500. For example, the size of one side of the aperture 411 facing the second reflection module 300 is smaller than the size of the aperture 411 facing the image sensor module 500.

To effectively block light that may cause a flare phenomenon, the inner wall 411a of the aperture 411 may be surface-treated to scatter light.

For example, the inner wall 411a of the aperture 411 may be roughened. The inner wall 411a of the aperture 411 may be rougher than other surfaces of the frame 410.

For example, the inner wall 411a of the aperture 411 may be roughened by being corrosion-treated.

A light absorbing layer may be provided on the inner wall 411a of the aperture 411 to block unnecessary light. For example, due to the light absorbing layer, the inner wall 411a of the aperture 411 may have a lower reflectance than that of other surfaces of the frame 410. The light absorbing layer may be black.

The frame 410 is disposed in such a manner that one of the two long sides faces the bottom of the housing 600 and two short sides face the inner side of the housing 600.

A coupling portion protrudes from an inner side surface of the housing 600 facing the frame 410, and a stepped portion 413 is provided on the frame 410. The stepped portion 413 of the frame 410 may be fitted to the coupling portion of the housing 600.

The stepped portion 413 of the frame 410 may be formed between both side short sides of the frame 410 and the aperture 411.

The infrared cutoff filter 450 is disposed on the frame 410 to cover the aperture 411. For example, the infrared cutoff filter 450 is coupled to one surface (refer to FIGS. 8 to 11) of the frame 410 facing the second reflection module 300 or to the other surface (refer to FIGS. 3 to 7) of the frame 410 facing the image sensor module 500.

For example, in a case in which the infrared cutoff filter 450 is disposed close to the image sensor 510 (e.g., in the case in which the infrared cutoff filter 450 is disposed on the sensor housing 550 of the image sensor module 500), the infrared cutoff filter 450 needs to have a size corresponding to the size of the image sensor 510.

However, in the camera module according to an example of the present disclosure, since the infrared cutoff filter 450 is disposed on the light-blocking structure 400 rather than the sensor housing 550 of the image sensor module 500, the infrared cutoff filter 450 may be disposed relatively far from the image sensor 510, and accordingly, the size of the infrared cutoff filter 450 may be reduced.

The protrusion 430 is formed to extend from the frame 410 toward the second reflection module 300. For example, the protrusion 430 may extend toward the second reflection module 300, in a space between both short sides of the frame 410 and the aperture 411.

To effectively block light that may cause flares, the surface of the protrusion 430 may be surface-treated to scatter light.

For example, the surface of the protrusion 430 may be roughened. The surface of the protrusion 430 may be rougher than the surface of the housing 600.

For example, the surface of the protrusion 430 may be roughened by corrosion treatment.

A light absorbing layer may be provided on the surface of the protrusion 430 to block unnecessary light. For example, due to the light absorbing layer, the surface of the protrusion 430 may have a lower reflectance than that of the surface of the housing 600. The light absorbing layer may be black.

On the other hand, the infrared blocking filter 450 may include a light-blocking member 470. By providing the light-blocking member 470 on the infrared cutoff filter 450, the effect of blocking light that may cause a flare phenomenon may be significantly increased.

The light-blocking member 470 may be in the form of a black film, and may be continuously disposed along the edge of the infrared cutoff filter 450.

The infrared cutoff filter 450 has a rectangular shape having a long side and a short side, and the light-blocking member 470 may be configured in such a manner that portions thereof corresponding to the center of the long side and the center of the short side of the infrared cutoff filter 450, respectively, further protrude toward the center of the infrared cutoff filter 450, than the other portions of the light-blocking member 470.

The size of the plane surrounded by the light-blocking member 470 is larger than the size of one side of the aperture 411 facing the second reflection module 300.

In addition, the size of the plane surrounded by the light-blocking member 470 is smaller than the size of the other side of the aperture 411 facing the image sensor module 500.

As set forth above, in a camera module according to an example, the occurrence of lens flare may be reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module including at least one lens;
   a housing configured to accommodate the lens module;
   a first reflection module disposed in front of the lens module;
   a second reflection module disposed behind the lens module;
   an image sensor module configured to receive light reflected from the second reflection module; and
   a light-blocking structure, disposed in the housing between the second reflection module and the image sensor module, comprising an aperture configured to pass light, an infrared cutoff filter disposed to cover the aperture, a frame in which the aperture is formed, and a protrusion extending from the frame towards the second reflection module.

2. The camera module of claim 1, wherein an inner wall of the aperture has an inclined surface.

3. The camera module of claim 1, wherein the aperture is configured to increase in size towards the image sensor module.

4. The camera module of claim 3, wherein the infrared cutoff filter is coupled to a surface of the frame facing the second reflection module or another surface of the frame facing the image sensor module.

5. The camera module of claim 1, wherein an inner wall surface of the aperture is rougher than another surface of the frame.

6. The camera module of claim 1, wherein the frame comprises a stepped portion fitted and coupled to the housing.

7. The camera module of claim 1, wherein the frame has a rectangular shape, and
the protrusion extends toward the second reflection module, in a space between opposing shorter sides of the frame and the aperture.

8. The camera module of claim 1, wherein a surface of the protrusion has a reflectance lower than a reflectance of a surface of the housing.

9. The camera module of claim 1, wherein a surface of the protrusion is rougher than a surface of the housing.

10. The camera module of claim 1, wherein the infrared cutoff filter comprises a light-blocking member.

11. The camera module of claim 10, wherein the light-blocking member is a black film continuously disposed along an edge of the infrared cutoff filter.

12. The camera module of claim 11, wherein the infrared cutoff filter has a rectangular shape, and intermediate portions of each side of the light-blocking member protrude inwards.

13. The camera module of claim 12, wherein the intermediate portions correspond to central portions of long and short sides of the light blocking member.

14. The camera module of claim 11, wherein a size of a plane surrounded by the light-blocking member is larger than a size of a side of the aperture facing the second reflection module and smaller than a size of another side of the aperture facing the image sensor module.

* * * * *